Patented July 6, 1954

2,683,171

UNITED STATES PATENT OFFICE 2,683,171

BENZYL CINNAMYL KETONE THIOSEMI-CARBAZONES

Hans Schmidt, Wuppertal-Vohwinkel, and Robert Behnisch and Ernst Schraufstatter, Wuppertal-Elberfeld, Germany, assignors to Schenley Industries, Inc., New York, N. Y., a corporation of Delaware No Drawing. Application December 19, 1951, Serial No. 262,491

Claims priority, application Germany January 8, 1951

3 Claims. (Cl. 260—552)

1

This invention relates generally to organic chemical compounds that are useful in chemotherapy and, in a more particular sense, it is concerned with benzyl cinnamyl ketone thiosemicarbazone and nuclearly substituted benzyl cinnamyl ketone thiosemicarbazones, which are characterized by especially strong inhibitory effects upon pathogenic microorganisms, including those that cause tuberculosis, and which are useful also in the treatment of bacterial inflammation.

It has been found, when testing the efficacy of various aromatic thiosemicarbazones against tuberculosis that the aromatic aldehyde-thiosemicarbazones have a stronger inhibitory effect, generally, than aromatic ketone-thiosemicarbazones, which have been regarded, therefore, as being less effective or even ineffective for this use against pathogens of this type. Furthermore, compounds of the latter type have been thought to be, generally speaking, essentially more toxic than the former type of compound.

It is now found, according to this invention, that a particular, limited, group of aromatic ketone-thiosemicarbazones is an exception to these generalities, and that these compounds are highly effective against tubercle bacilli.

These novel compounds are the thiosemicarbazones of benzyl cinnamyl ketone itself and of certain substituted benzyl cinnamyl ketones having one or more therapeutically activating substituents at either or both of the aromatic nuclei, such substituents being, for example, halogen, amino, acylamino, alkylamino, hydroxy, alkoxy, aryloxy, acyloxy, alkylmercapto, nitro, carboxy, carboxyalkyl, or alkylsulfone groups. The nuclei may bear one or more of these substituents or combinations thereof.

Although all members of the group of substituted benzyl cinnamyl ketone thiosemicarbazones are useful agents against pathogenic microorganisms, those compounds wherein the sole nuclear substituent is a lower alkoxy group on the cinnamyl moiety, particularly those instances in which it is at the para position, are especially valuable, therapeutically useful, substances and these compounds, therefore, together with benzyl cinnamyl ketone thiosemicarbazone itself, constitute the presently preferred embodiments of the invention.

These new compounds are distinguished, not only by having a high tuberculostatic effect, superior to that of benzalacetone-thiosemicarbazone, but additionally by a surprisingly good compatibility and tolerance when administered. Furthermore, the compounds obtained according to the present invention are distinguished, apart from their potency against tuberculosis-producing bacteria, by their activity against microorganisms that cause bacterial inflammation.

The novel compounds of this invention may be represented by the formula:

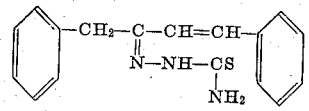

wherein either or both of the aromatic nuclei may be devoid of substituent groups or may bear a substituent, or more than one substituent, which individually may be in the ortho, meta or para positions, selected from the group consisting of aryloxy, lower alkoxy, halo, amino, alkylamino, acylamino, nitro, hydroxy, acyloxy, alkylmercapto, alkylsulfono, carboxylic acid and alkylcarboxylic acid groups.

This new group of therapeutically active thiosemicarbazones according to this invention may be prepared by reacting thiosemicarbazide upon the corresponding benzyl cinnamyl ketones in the conventional manner, using catalysts if necessary. If desired, modification or exchange of the substituents may be effected after preparation of the thiosemicarbazones. It will be understood that the products of this invention may be obtained also by reacting thiosemicarbazide, or one of its functional derivatives such as a lower aliphatic ketone thiosemicarbazone, with a functional derivative of the selected benzyl cinnamyl ketone such as its hydrazone, oxime, azine, semicarbazone, acetals, acetates and the like.

To illustrate typical procedures for preparing these novel benzyl cinnamyl ketone thiosemicarbazones, the following examples are provided, without intention that they will be construed as limitations upon the invention.

*Example 1*

Preparation of:

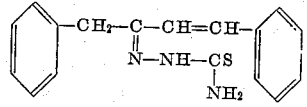

About 11.1 grams of benzyl cinnamyl ketone and 4.5 grams of thiosemicarbazide are reacted with each other in a mixture of 50 cc. of glacial acetic acid and 50 cc. of ethanol after boiling for 5 hours, then the reaction mixture is poured into water causing separation of the sparingly water-soluble product which is removed and purified by treatment with boiling ligroin. The benzyl cinnamyl ketone thus obtained, after being recrystallized from an 80% ethanol water mixture, melts at 135° C.

*Example 2*

Preparation of:

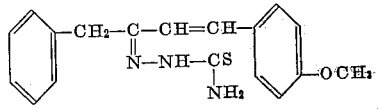

About 12.6 grams of benzyl p-methoxy-styryl ketone and 4.5 grams of thiosemicarbazide are reacted together in 500 cc. of ethanol after boiling for 48 hours, then the ethanol is removed by distillation and the residue, after being extracted with hot ligroin, is recrystallized from a 90% ethanol-water mixture. The benzyl p-methoxy-styryl ketone thiosemicarbazone thus obtained melts at 155° C.

It will be understood that, by selecting a suitably substituted benzyl cinnamyl ketone as the starting material and proceeding in the manner described in the foregoing examples, any desired substituted benzyl cinnamyl ketone thiosemicarbazone may be obtained. Substituted products of this type may be obtained also by treatment of the product obtained as described in Example 1 with suitable reagents for effecting the desired substitution.

Having thus described the subject matter of this invention, what it is desired to secure by Letters Patent is:

1. Novel chemical compound represented by the formula:

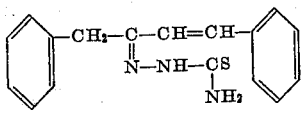

2. Novel chemical compounds represented by the formula:

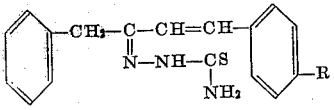

wherein R is of the group consisting of hydrogen and methoxy.

3. Novel chemical compound represented by the formula:

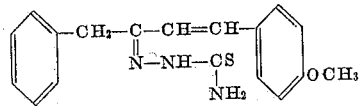

References Cited in the file of this patent

FOREIGN PATENTS

| Number | Country | Date |
|---|---|---|
| 584,381 | Great Britain | Jan. 14, 1947 |

OTHER REFERENCES

Sah et al., "Rec. Trav. Chim.," vol. 69 (1950), pp. 1545–56.

Bose et al., "Quarterly Journal Indian Chem. Soc.," vol. 4, pp. 84 to 88.